United States Patent
Beer

[11] Patent Number: 4,693,217
[45] Date of Patent: Sep. 15, 1987

[54] ARRANGEMENT FOR MOUNTING AN ENGINE ON THE CHASSIS OF A MOTOR VEHICLE

[75] Inventor: Wilhelm Beer, Russelsheim, Fed. Rep. of Germany

[73] Assignee: General Motors Corporation, Detroit, Mich.

[21] Appl. No.: 764,410

[22] Filed: Aug. 12, 1985

[30] Foreign Application Priority Data

Aug. 25, 1984 [DE] Fed. Rep. of Germany ....... 3431324

[51] Int. Cl.$^4$ ........................................... F16M 13/00
[52] U.S. Cl. .............................. 123/195 A; 267/140.1; 248/559; 248/566; 123/192 R
[58] Field of Search ........... 123/195 A, 192 R, 192 B; 180/300, 312; 248/559, 569, 566, 592, 636, 659; 188/378; 267/140.1

[56] References Cited

U.S. PATENT DOCUMENTS

| | | | |
|---|---|---|---|
| 3,445,080 | 5/1969 | Flannelly | 267/140.1 |
| 4,381,043 | 4/1983 | Fukushima | 180/300 |
| 4,440,375 | 4/1984 | Fukushima et al. | 248/559 |
| 4,445,662 | 5/1984 | Fukushima et al. | 248/559 |
| 4,456,213 | 6/1984 | Fukushima et al. | 248/559 |

Primary Examiner—Craig R. Feinberg
Assistant Examiner—David A. Okonsky
Attorney, Agent, or Firm—R. L. Phillips

[57] ABSTRACT

An engine mounting arrangement is disclosed including a rubber-metal component and a vibration attenuating device that is comprised of a lever arm provided with a mass on its free end. The low frequency as well as the high frequency oscillations are damped thereby without establishing a noise bridge between the engine and the vehicle by the lever arm extending between elastomeric members and bearing in the axial direction of the engine mounting arrangement against these elastomeric members.

8 Claims, 7 Drawing Figures

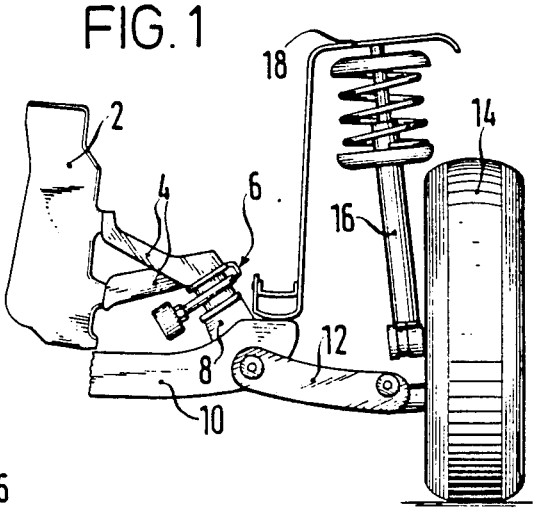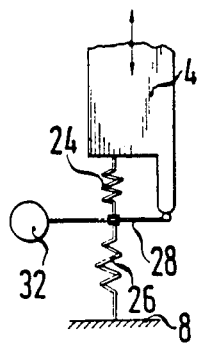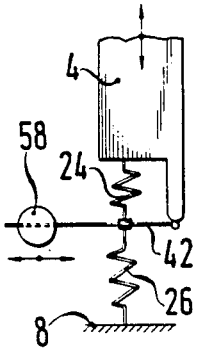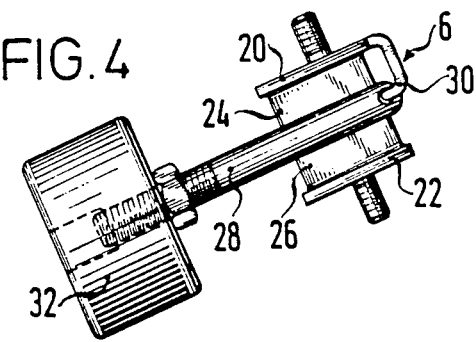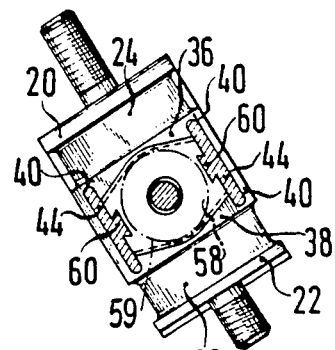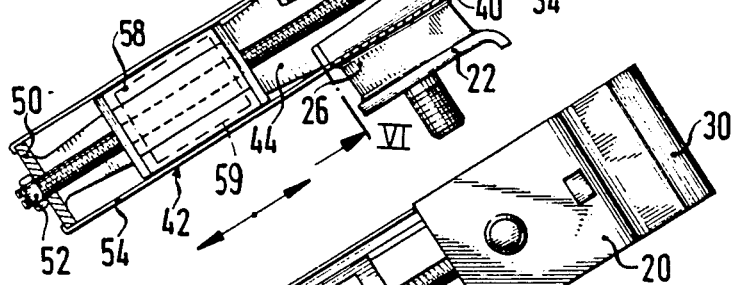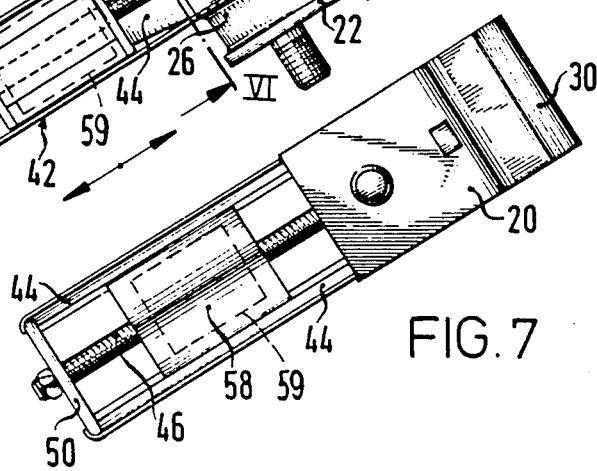

ARRANGEMENT FOR MOUNTING AN ENGINE ON THE CHASSIS OF A MOTOR VEHICLE

TECHNICAL FIELD

This invention relates to an arrangement for mounting an engine, or an engine-transmission unit, on the chassis of a motor vehicle, the mounting arrangement comprising a rubber-metal type damping assembly and a vibration attenuating member which includes a lever arm connected to the engine or a component disposed thereon and a mass arranged on the side of the free end of the lever arm.

BACKGROUND OF THE INVENTION

When vibrations are included in a vehicle by road irregularities, such as transverse gaps in the road, the pulses are transmitted by way of the chassis to the drive unit comprised of the engine and the transmission. Because of acoustical considerations, the engine or the engine-transmission unit is usually supported on the chassis or the frame members of the unitized body by way of resilient mounts. As a result, vibrations are induced in the engine which are in the frequency range of the engine's natural frequency, i.e. between 7 and 10 hz, depending on tuning. These low-frequency sinusoidal engine vibrations can cause vibrations in the car that adversely affect the riding comfort. Thus, a more favorable solution is to employ engine mounts that are more rigid. However, there is a disadvantage in employing rigid mounts in that the high-frequency vibrations generated by the engine are then not adequately attenuated. Thus, the motor vehicle is at a disadvantage in terms of acoustical considerations.

It has been proposed that this problem can be resolved by employing an attenuator for the acoustic oscillations such as disclosed in the German Offenlegungschrift DE-OS No. 31 03 218. In this prior art arrangement, one end of a lever arm is attached to the engine or an engine bracket and the other end to a chassis component. The shortcoming of this arrangement is that a noise bridge is established between the engine and the chassis or the unitized body.

SUMMARY OF THE PRESENT INVENTION

It is an object of the present invention to improve a drive unit mounting arrangement of this type to the effect that both the low frequency as well as the high frequency vibrations are attenuated without causing a noise bridge to be established between the engine and the vehicle.

This object is accomplished in accordance with the present invention in that the lever arm is arranged such that it extends through the elastomeric members and bears against these members in the axial direction of the mounting arrangement. As a result, the structure-borne noise of the engine can only travel into the rubber-metal component but is not transmitted from there to the body or chassis.

Preferably, in the engine mounting system according to the present invention, the task of mounting the lever arm on the engine side is accomplished by the lever arm and on the engine side being attached to a bent portion of the outer section of the rubber-metal member connected with the engine. By virtue of this arrangement, the lever arm need not be mounted directly to the engine or an engine bracket. Furthermore, this makes for a very compact engine mounting arrangement which incorporates the lever arm mounting so that there is no need to provide separate mounting means for the lever arm on the engine.

Obviously, an engine mount of this type is able to cover only a fixed frequency range and that frequency range depends on the mass of the lever arm. Therefore, this mounting arrangement is insufficient to provide damping over the entire frequency range. This objective is accomplished in accordance with another characteristic feature of the invention by the mass, i.e. the weight on the lever arm, being displaceable along the lever arm in response to certain parameters in accordance with the engine induced frequency range. Preferably, the parameters used in controlling the displacement of the weight are the engine speed and the position of the accelerator pedal.

The movement of the mass along the lever arm may be effected mechanically, hydraulically, pneumatically, electrically or electromagnetically. However, a preferable arrangement is one wherein movement of the weight along the lever arm is effected by an electric motor. Preferably, the weight is guided on tracks and is adapted for movement along a threaded spindle driven by the electric motor.

A very suitable design configuration is one wherein in accordance with a further characteristic feature of the invention, the rubber members have secured therebetween a core made of a rigid material to which the lever arm comprised of the guide tracks and the threaded spindle is coupled.

Exemplary embodiments will now be described in detail by way of the drawings.

FIG. 1 illustrates schematically a partial front elevation of the engine mounting arrangement on the chassis.

FIG. 2 illustrates schematically the mounting arrangement with a stationary weight on the lever arm.

FIG. 3 illustrates schematically the mounting arrangement with a displaceable weight on the lever arm.

FIG. 4 illustrates a practical exemplary embodiment of the mounting arrangement including a lever arm having a stationary weight secured thereto.

FIG. 5 is a sectional view of an exemplary embodiment wherein the lever arm has a movable weight secured thereto.

FIG. 6 is a section extending, substantially, along line 6—6 in FIG. 5.

FIG. 7 is a plan view of FIG. 5.

In FIG. 1, the engine 2 (illustrated only partially) which is combined with the transmission into one unit, is supported through brackets 4 on the mounting arrangement 6 referred to hereafter as the engine mount. The engine mount 6 is disposed at or on a vehicle chassis component, in this instance an engine mount support member 8 projecting from a transverse frame member 10. A control arm 12 is articulated to the transverse member 10 and is coupled to the spindle of the front wheel 14 which is suspended on the vehicle body 18 through the strut 16.

As illustrated in FIG. 4, the engine mount is comprised of the rigid outer portion 20 which is secured to the support bracket 4 of the engine. The other rigid outer portion 22 is attached to the engine mount support member 8 projecting from the transverse member 10. The elastomeric members 24 and 26 are disposed, respectively, adjacent to the rigid outer members 20 and 22, and the lever arm 28 is secured intermediate these rubber members. The rigid outer member 20 disposed on the engine side is provided with a bent portion 30 to which the lever arm 28 is secured. Thus, the lever arm, which extends between the two elastomeric members 24, 26, bears against the rubber members 24, 26 in both directions. The lever arm 28 supports on its free end the weight 32 which serves as a frequency range determining mass and to this end, the spacing between the weight 32 from the lever arm mounting point can be adjusted in accordance with the frequency range to be covered. The engine mount illustrated in FIG. 4 corresponds to the schematic illustration in FIG. 2 and provides for the necessary attenuating energy being obtained with a substantially lower mass in comparison to a conventional attenuating device (low mass, large lever arm, great amplitude). Thus, the engine mount according to the invention is very suitable for use in small, lightweight cars.

If now that frequency range which occurs or is expected to occur during the entire engine vehicle operating range is to be covered, the weight 32 on the lever arm 28 must be displaced according to that particular frequency. An arrangement of this type is illustrated in the exemplary embodiment according to FIGS. 5–7. The parts of FIGS. 5–7 corresponding to those of FIG. 4 are designated by same reference numerals. The mounting arrangement illustrated in FIGS. 5–7 also includes the outer member 20 disposed adjacent to the engine, the rigid outer member 22 disposed adjacent to the chassis and the elastomeric members 24 and 26. Between the rubber members 24 and 26 there is disposed a rigid core 34 which is hollow and is open at one end. The walls of the core 34 are illustrated in FIG. 6 and, as apparent from this figure, the wall portions 36, 38 engaging the elastomeric portions 24, 26 are bow-shaped. Furthermore, lateral grooves 40 are provided which, as illustrated in FIG. 5, have a bottom that extends at an angle and are adapted to receive tracks 44 formed on the lever arm. A threaded spindle 46 is threaded into the end wall 48 of the core 34 and urges the tracks 44 into the grooves 40 so that a form-locking connection is established between the lever arm 42 and the core 34. The tracks 44 are formed with an end wall 50 and a nut 52 that is threaded onto the spindle 46 engages with this end wall. A protective cap designated by the numeral 54 shields the spindle 46 and the tracks 44 from dirt and corrosion.

The end wall 48 of the core 34 is tapered outwardly so as to form a projection 56 by which the core is mounted in the bent portion 30 of the outer member 20. Since the pivoting angle of the core 34 relative to the outer portion 20 need not be very large, the type of mounting illustrated in the drawings (pivot bearing with small pivoting angle) is sufficient. To eliminate the need for servicing, an elastomeric member, which is formed during the vulcanizing of the rubber metal parts, is interposed between the projecting portion 56 and the bent portion 30.

The attenuating mass is mounted on the threaded spindle 46 and adapted for longitudinal displacement thereon. Inside this attenuating mass, i.e. the weight 58, there is disposed an electric motor which serves as a control unit for the movement and which effects through its rotation the displacement of the weight 58 on the spindle 46. An electric motor 59 is mounted in a suitable manner inside the weight 58, i.e. the attenuating mass. The weight 58 is slidably guided on the tracks 44 by means of a dove-tailed guide member 60, as illustrated in FIG. 6. A contact strip (not illustrated) for conducting the pilot current to the electric motor in the weight 58 is embedded inside the dove-tailed guide member 60.

Various engine parameters may be utilized for controlling the movement of the weight 58. A most suitable arrangement is one in which the weight 58 is adjusted to the respective high frequency oscillation by using the engine speed and the accelerator pedal position as parameters. These two, and perhaps more parameters, are processed in a control unit which will then forward the pilot current to the electric motor.

The embodiments of the invention in which an exclusive property or privilege is claimed are defined as follows:

1. Arrangement for mounting an engine or an engine-transmission drive unit on a chassis of a motor vehicle, including a damping assembly interposed between engine load bearing support means and comprised of a metal-rubber component and a vibration attenuating means comprising a lever arm securely connected at one end to elastomeric members, said lever arm having a mass secured to an opposite free end, the improvement comprising:
   the lever arm extending between said elastomeric members such that a longitudinal axis of said lever arm projects outwardly from a load bearing axis, said load bearing axis being formed along said load bearing support means,
   the lever arm having said one end secured to a bent portion of a rigid outer member that is part of the rubber-metal component and operatively connected to the engine.

2. Arrangement according to claim 1, the improvement comprising:
   mass being controlled by an engine parameter in accordance with the engine induced frequency range and being adapted for movement along the lever arm.

3. Arrangement according to claim 1 or 2, the improvement comprising:
   the mass of the lever arm being controlled in accordance with the engine operating speed and load.

4. Arrangement according to claim 2, the improvement comprising:
   the movement of the weight along the lever arm being effected by an electric motor.

5. Arrangement according to claims 1 or 2, the improvement comprising:
   the weight being guided in tracks and being adapted for movement on a threaded spindle.

6. Arrangement according to claim 5, the improvement comprising:
   a core made of a rigid material interposed between the elastomeric members, and the lever arm being comprised of the tracks and the threaded spindle being connected to said core.

7. Arrangement according to claim 6, the improvement comprising:
   the core being hollow, and an end face adjacent to the bent portion of the outer member being provided with an end wall having a conical outwardly tapering cross section with an outer end that is adapted for mounting in the bent portion.

8. Arrangement according to claim 7, the improvement comprising:
   the spindle being threaded into the end wall, and the tracks being retained in grooves formed in the core.

* * * * *